(12) United States Patent
Norris et al.

(10) Patent No.: US 8,550,704 B2
(45) Date of Patent: Oct. 8, 2013

(54) METHOD FOR DETECTING AUTOMOBILE DIFFERENTIAL FILL OMISSION

(75) Inventors: Timothy Norris, Cambridge (CA); Peter Couto, Cambridge (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 29 days.

(21) Appl. No.: 13/297,763

(22) Filed: Nov. 16, 2011

(65) Prior Publication Data

US 2013/0121371 A1     May 16, 2013

(51) Int. Cl.
| | |
|---|---|
| *G01N 25/00* | (2006.01) |
| *G01N 25/56* | (2006.01) |
| *G01M 15/00* | (2006.01) |
| *G01F 23/00* | (2006.01) |

(52) U.S. Cl.
USPC ............... 374/45; 374/54; 73/340; 73/292; 73/295; 73/115.06

(58) Field of Classification Search
USPC ............... 73/295; 374/45, 120, 121, 10, 100
See application file for complete search history.

(56) References Cited

U.S. PATENT DOCUMENTS

| | | | |
|---|---|---|---|
| 4,501,146 A | 2/1985 | Greenhalgh | |
| 5,568,262 A | 10/1996 | LaChapelle et al. | |
| 6,866,804 B2 | 3/2005 | Yamashita et al. | |
| 7,445,574 B2 * | 11/2008 | Weith | 475/160 |
| 7,663,130 B1 * | 2/2010 | Yarbrough et al. | 250/577 |
| 8,003,942 B2 | 8/2011 | Garvey, III et al. | |
| 2006/0262829 A1 * | 11/2006 | Manlove et al. | 374/120 |
| 2007/0152152 A1 * | 7/2007 | Deasy et al. | 250/338.1 |
| 2008/0159616 A1 | 7/2008 | Fellinger | |
| 2008/0305012 A1 | 12/2008 | Camenisch | |
| 2010/0218600 A1 | 9/2010 | Auge et al. | |

FOREIGN PATENT DOCUMENTS

| | | |
|---|---|---|
| JP | 1214749 A | 8/1989 |
| JP | 9033320 A | 2/1997 |
| JP | 2006240659 A | 9/2006 |
| WO | 03069324 A1 | 8/2003 |

OTHER PUBLICATIONS

Hurley, Joshua D. An Experimental Investigation of Thermal Behavior of an Automotive Rear Axle: A Thesis Presented for the Degree of Master of Science in the Graduate School of the Ohio State University. The Ohio State University, 2009.

\* cited by examiner

*Primary Examiner* — Lisa Caputo
*Assistant Examiner* — Brandi N Hopkins
(74) *Attorney, Agent, or Firm* — Christopher G. Darrow; Young Basile Hanlon & MacFarlane P.C.

(57) ABSTRACT

A method of detecting an omission to fill an automobile differential housing with fluid in the course of an assembly procedure is carried out using an infrared sensor to read differential housing temperature. The camera produces an electrical signal that is processed to provide an indication as to whether or not the differential housing has been properly filled. An infrared sensing camera is the preferred thermal detector.

5 Claims, 2 Drawing Sheets

METHOD FOR DETECTING AUTOMOBILE DIFFERENTIAL FILL OMISSION

FIELD OF THE INVENTION

The invention relates to automobile assembly processes and more particularly, to a testing procedure for determine whether an automobile differential housing has been properly filled with fluid.

BACKGROUND OF THE INVENTION

In the course of assembling an automobile, it is critical that certain components be filled with the appropriate fluids. One such component is the differential housing which requires fluid for both lubrication and cooling. If a vehicle leaves the factory with an unfilled or improperly filled differential, the omission may not be detected until after the vehicle is put into service and a failure of the differential occurs.

SUMMARY OF THE INVENTION

The present invention provides a practical method for detecting an omission to fully fill an automobile differential housing with fluid in the course of an assembly or repair procedure. As hereinafter described in detail, a disclosed embodiment of the method invention involves steps that can be taken at the end of an assembly line; e.g., during or just after a chassis inspection. These steps include detecting the temperature of a differential housing which has been operated under pre-specified conditions for a pre-specified time, and producing a signal indicating the fluid fill condition as a function of the detected temperature.

In the illustrative embodiment hereinafter described in detail, the post-operating temperatures of properly and improperly filled differentials are empirically determined and used to calibrate a processor which receives temperature signals from, for example, an infrared camera. Differential housing temperatures are taken shortly after operating the vehicle on, for example, a "rolls tester", for a period that is long enough for the differential housing to have reached a steady state temperature. The detected temperature is then processed such as by comparison to a table of predetermined temperatures, to determine the fill condition and produce an output indicating whether corrective measures are required. The table may consist of a single temperature or a range of temperatures, depending on the degree of resolution required. For example, a single temperature can be used if the test is set up to indicate only whether the detected temperature is above or below a set point. Multiple temperatures may be used if it is desired to indicate partial fills as well as full fills and no fills. The operating step can be performed on the road as well as on a rolls tester.

Other advantages, features and characteristics of the present invention will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
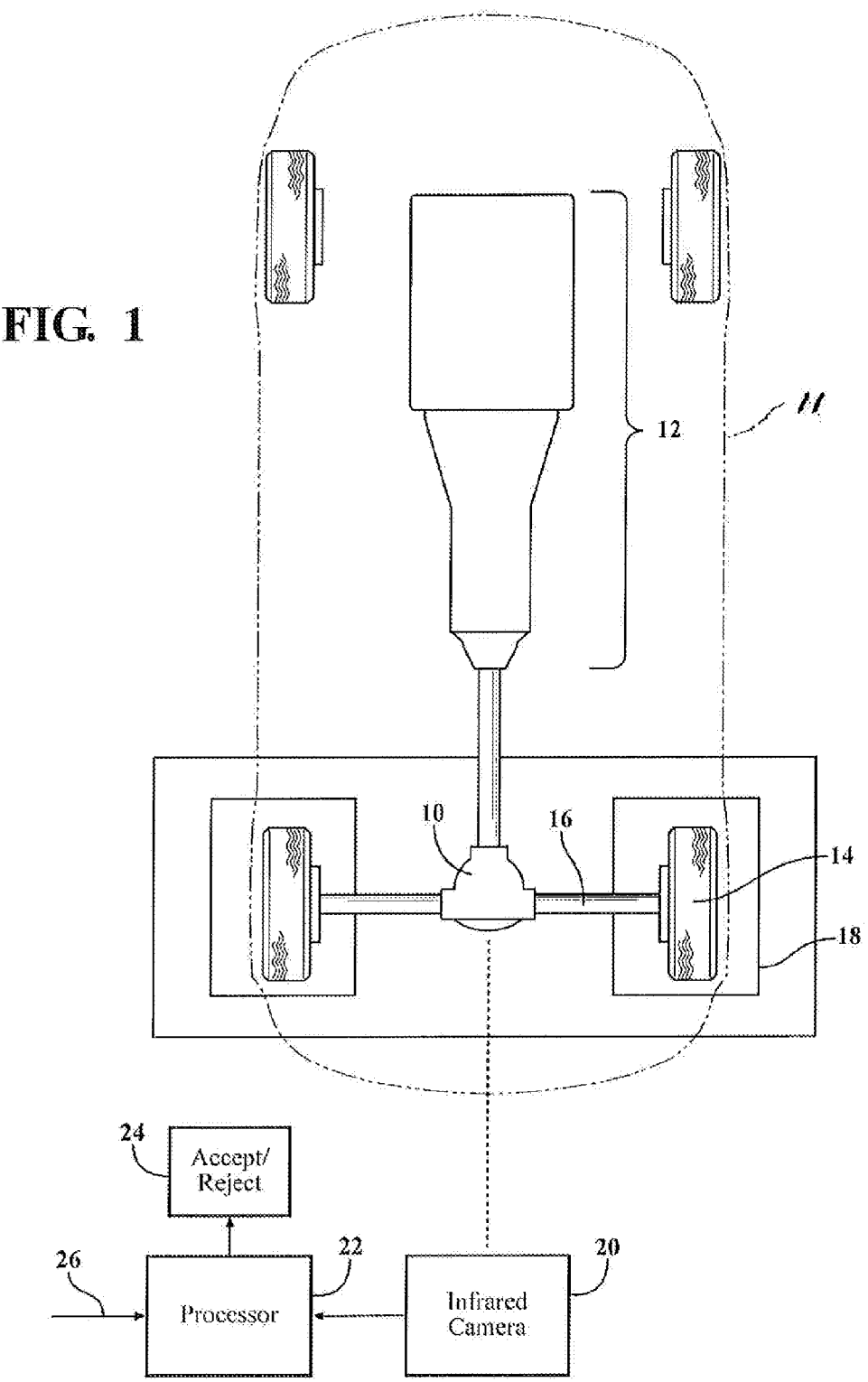
FIG. 1 is a block diagram of an apparatus for carrying out the disclosed method.

FIG. 1 shows an apparatus for carrying out a method for detecting the fluid fill condition of a differential housing 10 in a vehicle 11 having a drive train 12 at or near the completion of the automobile assembly procedure. In this embodiment, the method is carried out after a final performance check, at least part of which takes place after the vehicle has been run for a period of time on a rolls tester installation. Here, the vehicle is shown as a rear-wheel drive vehicle, but the invention is equally applicable to any vehicle having a fluid-filled housing in the drive train. Vehicle 10 is equipped with a differential 10 and drive train 12 (engine, transmission, drive shaft, etc.) in which driven wheels 14 are connected to the differential 10 by way of half-axles 16. In FIG. 1, the vehicle 11 is stationed on a rolls tester having rollers 18 so the drive train and the differential 10 can be operated as hereinafter described.

The apparatus of FIG. 1 further comprises a non-contacting temperature sensing device preferably in the form of an infrared camera 20 which is locatable so as to read the temperature of a spot on the differential housing which is free from ridges or flanges. Although FIG. 1 indicates the camera 20 aimed at the differential 10 while vehicle 11 is on the rollers 18, it is to be understood that the temperature measurement step is typically carried out after the vehicle 11 has been removed from the rolls tester and taken to another location. Alternatively, the "operating" step can be performed on the road as explained above.

A suitable infrared camera 20 is the Flir Model A300. The infrared thermal camera 20 produces an electrical signal representing differential temperature. This signal is sent to a processor 22 calibrated to determine on the basis of temperature whether or not the housing of the differential 10 contains a proper amount of fluid; i.e., a higher sensed temperature indicates a good fill whereas a lower sensed temperature indicates a partial fill or a "no fill" condition. The processor 22 is connected to an indicator 24 which may take any of a variety of forms so as to produce a suitable indication of the fill status of the differential 10 undergoing examination. For example, a single red light may indicate a bad fill.

It will be understood that the temperatures indicative of "fill" and "no-fill" conditions will vary from one vehicle type to another depending on vehicle specifications, the time duration of the operating step and the power setting of the vehicle during the run-up. It has been found that for one particular vehicle, an SUV with all-wheel drive, the temperature ranges from about 25° C. for a no-fill to about 45° C. for a good fill after a two-minute operation at 120 km/hr. Of course, the system can be set up to accommodate two or more different vehicle specifications; i.e., engine ratings, differential sizes, and other parameters, all of which may produce their own unique temperature profiles. In this event, additional data inputs may be made by way of input 26 to the processor 22 to inform the processor which vehicle is being tested, thereby to determine the temperature standards to be applied.

Figure 2:
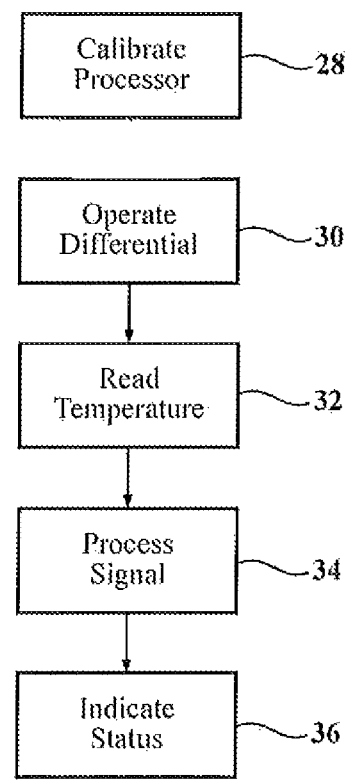
FIG. 2 is a flow diagram of steps in the method.

Referring now to FIG. 2, the method for carrying out an illustrative form of the invention will be described with reference to the five method steps 28, 30, 32, 34, 36. At step 28, the processor 22 is calibrated empirically by taking temperature readings from one or more vehicles exhibiting various fill conditions after being run at a given speed for a given time. As indicated above, if the facility where the differential fill test is to be carried out produces different vehicles, the processor 22 is equipped with a number of different calibration temperature sets, each of which can be selected by appropriate data on the input line 26. Step 28 is not shown directly connected to step 30 because the calibration step can be carried out offline; i.e., prior to the actual performance of the method described herein.

At step 30, the vehicle 11 containing the differential 10 is placed in situated such that the drive train 12 and differential 10 can be operated at the desired speed for the desired period of time in order to establish the temperatures that will be measured and used to indicate the fill condition of the differential 10.

At step 32, the infrared camera 20 is aimed at the appropriate location of the differential housing and used to read the temperature thereof. An appropriate location may be a relatively smooth, unflanged surface area away from heat sinks. The temperature is, in this case, represented by an output signal which is connected to the processor 22 as explained above.

At step 34, the read temperature represented by the signal from the infrared camera 20 is processed to determine the fill status of the differential 10. Depending on the detected temperature, the signal is transmitted to unit 24 to produce a status indication shown by step 36. Any of several indicator protocols and/or styles may be used. A simple example is to use a red light for a no-fill reading, a yellow light for a partial fill, and a green light for a good fill. In a simpler system, only no-fill conditions are indicated. The output indicator may also be audible or digitally displayed and recorded as part of the particular vehicle assembly history.

The method contemplates the taking of corrective measures where anything other than a good fill is indicated.

While the invention has been described as taking place in association with fully assembled, new vehicle assembly, it is to be understood that the method can be used after the repair of a "used" vehicle, as well as for drive train components have not yet been installed in a vehicle chassis.

What is claimed is:

1. A method of detecting a lubricant fill condition of an automobile differential housing comprising the steps of:
    operating an automotive differential installed in a housing for a predetermined time period;
    using a remote thermal detecting device to detect a temperature of the differential housing after said period; and
    indicating an inadequate fill condition whenever the temperature detected by the thermal detecting device is below a predetermined level.

2. The method defined in claim 1 wherein the temperature detection step is carried out by a remote temperature sensing device after operating the differential for a predetermined time and at a predetermined speed so as to establish a steady state condition.

3. The method defined in claim 1 wherein the step of determining the temperature of the differential housing is carried out using an infrared sensing device.

4. The method defined in claim 1 wherein the step of indicating an inadequate fill condition is carried out using a calibrated processor connected to said detecting device.

5. A method of detecting a lubricant fill condition of a vehicle differential comprising the steps of:
    i. operating the drive train of a vehicle equipped with a differential having an enclosed housing;
    ii. sensing the temperature of the differential housing and producing a signal related to said temperature; and
    iii. comparing the signal to a stored standard and indicating a below-normal fill condition whenever the sensed temperature is below the stored standard.

* * * * *

UNITED STATES PATENT AND TRADEMARK OFFICE
CERTIFICATE OF CORRECTION

PATENT NO. : 8,550,704 B2
APPLICATION NO. : 13/297763
DATED : October 8, 2013
INVENTOR(S) : Timothy Norris et al.

It is certified that error appears in the above-identified patent and that said Letters Patent is hereby corrected as shown below:

In the Specification,
in Column 1, Line 8, delete "determine" and insert --determining--,
in Column 2, Line 17, after vehicle delete "10" and insert --11--,
in Column 3, Line 10, before situated such, delete "placed in",
in Column 3, Line 25, delete "unit" and insert --indicator--.

Signed and Sealed this
Eleventh Day of March, 2014

Michelle K. Lee
*Deputy Director of the United States Patent and Trademark Office*